Sept. 12, 1961 H. S. HEMSTREET 2,999,322
VISUAL DISPLAY METHOD AND APPARATUS
Filed Jan. 5, 1955 6 Sheets-Sheet 1

HAROLD S. HEMSTREET
INVENTOR
BY
ATTORNEY

Sept. 12, 1961  H. S. HEMSTREET  2,999,322
VISUAL DISPLAY METHOD AND APPARATUS
Filed Jan. 5, 1955  6 Sheets-Sheet 2

HAROLD S. HEMSTREET
INVENTOR

BY *Richard F. Stephens*
ATTORNEY

FIG. 5

HAROLD S. HEMSTREET
INVENTOR
BY Richard G. Stephens
ATTORNEY

FIG. 6

HAROLD S. HEMSTREET
INVENTOR
BY Richard G. Stephens
ATTORNEY

Sept. 12, 1961   H. S. HEMSTREET   2,999,322
VISUAL DISPLAY METHOD AND APPARATUS
Filed Jan. 5, 1955   6 Sheets-Sheet 5

HAROLD S. HEMSTREET
INVENTOR
ATTORNEY

Sept. 12, 1961  H. S. HEMSTREET  2,999,322
VISUAL DISPLAY METHOD AND APPARATUS
Filed Jan. 5, 1955  6 Sheets-Sheet 6

HAROLD S. HEMSTREET
INVENTOR
BY *Richard G. Stephens*
ATTORNEY

United States Patent Office 2,999,322
Patented Sept. 12, 1961

2,999,322
VISUAL DISPLAY METHOD AND APPARATUS
Harold S. Hemstreet, Binghamton, N.Y., assignor to General Precision Inc., a corporation of Delaware
Filed Jan. 5, 1955, Ser. No. 480,033
34 Claims. (Cl. 35—12)

My invention relates to method and apparatus for presenting a visual display simulating the scenes viewed from points along the path of a moving vehicle following a particular course or limited deviations from the aforesaid course, and is of particular value as a novel method and apparatus for use in conjunction with grounded aircraft trainers for presenting a visual display to a student for training purposes. Although grounded aircraft trainers have heretofore been devised for the instruction of persons in the techniques and procedures of instrument flight most of such prior training devices have not realistically simulated the conditions of "contact" flight, in which the pilot controls his aircraft according to visual observation of the ground. Of considerable importance is the instruction of pilots in the proper flight techniques during the period of transition from instrument flight to contact flight. In United States Patent No. 2,938,279 granted on May 31, 1960, to Harold S. Hemstreet and Robert A. Woodson for "Method and Means for Producing Visual Display in Grounded Aircraft Trainers" there is shown methods and apparatus which overcome most of the abovementioned deficiencies of prior art trainers, but the Hemstreet and Woodson invention is relatively complex and expensive, and does not readily lend itself to simulation of great changes in altitude. While such a system is of considerable value in simulating flight at low altitudes and for short distances, such as those commonly flown by rotary-winged aircraft, a need has existed for improved methods and apparatus for simulating the scenes viewed during a course of travel which changes greatly in altitude and distance, such as those scenes viewed during landings and takeoffs made in a fixed wing aircraft. A common method of landing an aircraft at an airport is to make an instrument approach, relying entirely upon ILS indications until the airport runway may be seen, and then to complete the landing relying solely upon visual contact with the ground. As mentioned above, the moments during which the pilot transfers from instrument flying to contact flying are very critical, and the success or failure of his landing often depends upon his actions during the period of transition. The instant invention relates to method and means capable of use in instructing pilots during such critical moments, and a realistic visual presentation may be made of flight paths which vary widely in altitude and direction. The novel method briefly described comprises providing an object having an appearance of an area viewed from a reference viewpoint, such as by taking a motion picture of an actual flight maneuver, projecting an image of the object such as the motion picture onto a viewing surface for observation as by a student in a conventional flight trainer, and automatically "distorting" the image or projected picture in accordance with deviations from the reference viewpoint or actual flight path of the simulated flight path "flown" by the student, so that the student sees in the projected picture substantially what would be seen while flying such a deviated flight path.

It is therefore a primary object of the invention to provide a novel projection method and apparatus by means of which a picture taken at a particular point may be distorted so as to simulate the scene as viewed from a different point.

It is an additional object of the invention to provide improved method and apparatus for presenting an improved visual display for use in conjunction with grounded training apparatus.

It is another object of the invention to provide improved grounded training apparatus which may be simply and inexpensively constructed and which will realistically simulate scenes viewed during actual flight.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Figures 1, 4A, 4B:
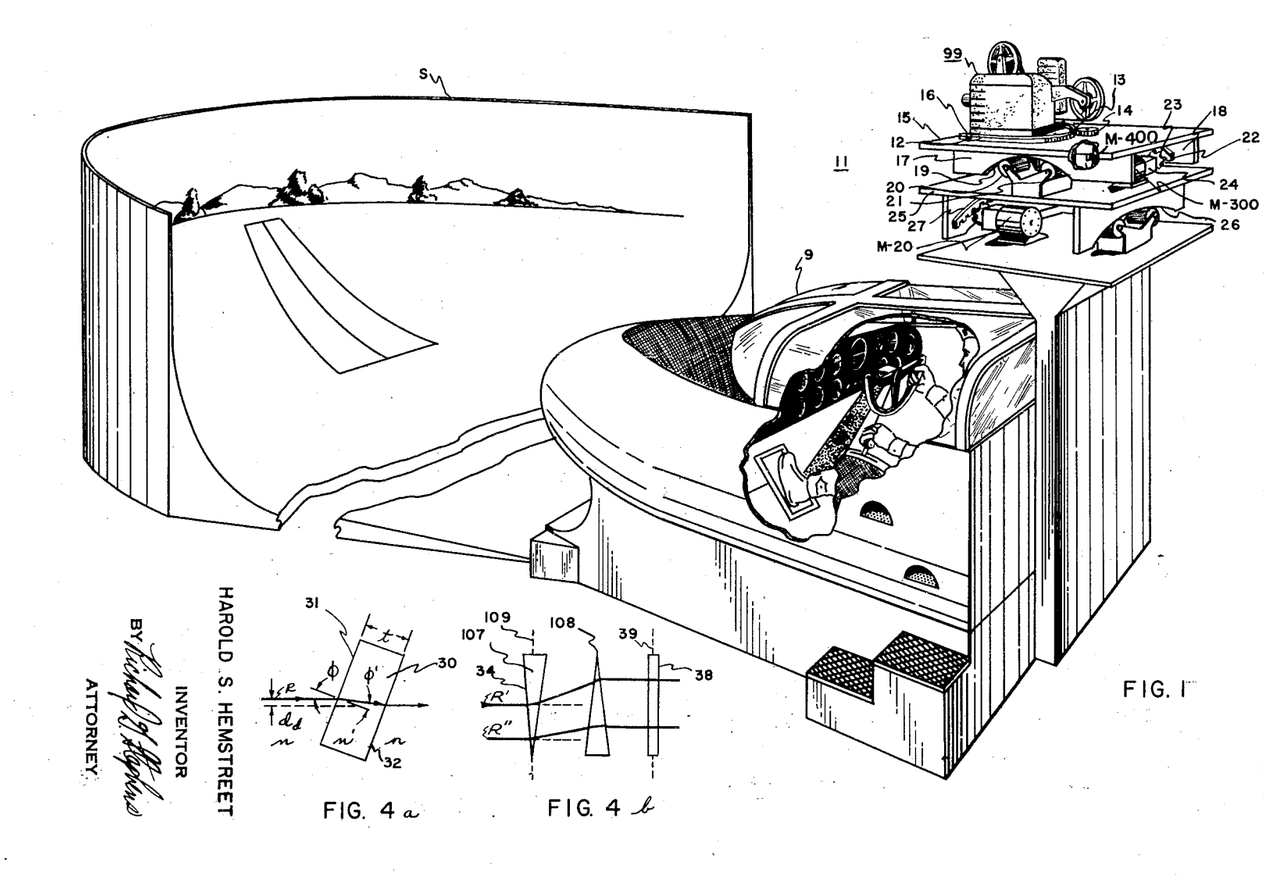
FIG. 1 is a perspective drawing showing the general arrangement of an embodiment of the invention as utilized in the instruction of persons in the operation of aircraft.
FIGS. 4a and 4b are optical diagrams explaining the theory of operation of a distorting means which may be utilized in my invention to simulate properly lateral displacement of the viewpoint from a reference viewpoint.

FIGURE 1 illustrates the general arrangement of a specific embodiment of the invention as utilized in producing a visual display for use in conjunction with a conventional grounded aircraft trainer. A mock-up of the cockpit of an actual aircraft is provided, with dummy controls operable by a student pilot to provide instrument indications on simulated instruments substantially duplicating those of an actual aircraft. Commonly provided with such trainers are an instructor's station (not shown) which may include duplicate simulated instruments, various controls for effecting simulated special and emergency flight conditions, and a conventional flight path recorder to chart the ground track of simulated flight. Such conventional trainers also include a plurality of analogue computers (not shown) which continuously solve the equations of motion of the simulated aircraft, providing shaft outputs and electrical potentials to operate the simulated instruments and indicators. Grounded trainers which are primarily intended for use in teaching instrument flying are generally provided with an opaque or translucent canopy, while the invention is provided with a transparent cockpit canopy 9 of glass, Plexiglas or equivalent transparent material, substantially simulating the windshield of an aircraft. A plain white screen S is provided in front of the cockpit, the screen being preferably of a size sufficient to cover the area which may be viewed by the student through the canopy 9. Low ambient light may be provided in the room in which the apparatus is disposed, the intensity of such light being preferably that of a cloudy day. Cloud projectors known in the art may be utilized to simulate flying through clouds and fog by projecting appropriate images and shadows onto canopy 9 or screen S. When the invention is utilized for teaching night landings, extremely low ambient light may be provided to simulate night-time visibility conditions.

Mounted a short distance above the cockpit mock-up and preferably as near as possible to the eye of a student situated within the cockpit is a motion picture projector 99 disposed to project an image of a ground scene upon screen S for observation by the student. Projector 99 is mounted upon a tilting mechanism 11 which allows rotation of the projector around three mutually perpendicular axes. An exemplary form of such tilting mechanism is shown in enlarged size in FIG. 1 for sake of clarity. The projector 99 is rotated relative to the stationary cockpit in response to simulated rolling, pitching and yawing to rotate and displace the scene on screen S viewed by the student to create the illusion that the cockpit is rolling, pitching and yawing. It will be apparent that in some embodiments of the invention the projector may be mounted in a stationary manner and the cockpit may be rolled, pitched and yawed to create similar illusions, or, further, both the projector and cockpit may be rotated. In FIG. 1 projector 99 is mounted on a plate 12 having an arcuate toothed portion disposed to engage gear 14. Plate 12 is pivotally attached to base plate 15 at bearing 16, so that rotation of gear 14 causes a yawing or turning rotation of projector 99 about the axis of bearing 16. Gear 14 is driven by servomotor M–400, which may comprise the heading servo of a conventional grounded trainer, or an additional servomotor positioned in the same manner as a conventional heading servo. Base plate 15 is rigidly mounted on rockers 17, 18 aligned longitudinally with the cockpit, each of said rockers having an arcuate portion 19 having a center of curvature located substantially at the viewpoint of a student seated within the cockpit. The rockers are mounted upon rollers such as 20, 21, and upon rocker 18 there is provided an arcuate toothed rack or internal ring gear segment 22. Gear 23, which is driven by servomotor M–300 through gearbox 24 meshes with gear segment 22, thereby pitching base 15 and projector 99 about an axis substantially coincident with the student's eye. Plate 25, which carries the above described apparatus of the tilting mechanism, is banked similarly by rotation of servomotor M–20, the center of curvature of arc 26 and the center of the pitch circle of gear segment 27 also corresponding to the viewpoint of the student. Thus by rotation of servomotors M–20, M–300 and M–400 projector 99 may be tilted so as to rotate and displace the picture cast on screen S to simulate the rolling, pitching and yawing of the simulated aircraft. A motion picture projected upon screen S can be correct perspective-wise for only one position of view, and the position of view preferably should not change as the projector is rotated relative to the cockpit. By rotating the projector relative to the cockpit around axes coincident with the student's eye, the correct viewpoint perspective-wise is maintained at the student's eye. The precise mechanical tilting arrangement shown in FIG. 1 is not an essential feature of my invention, and it will be understood that gimbal arrangements and other mechanical arrangements allowing relative rotation of the projector and cockpit may be substituted by those skilled in the art without departing from the invention. The perspective distortion caused by displacing the axes or relative rotation from the student's viewpoint is not critical in many embodiments of the invention, and in some embodiments of the invention, as for example, those in which the cockpit is rotated, it may be desirable to locate the axes of rotation at the center of gravity of the simulated aircraft to provide more realistic simulation of cockpit motion and proprioceptive effects, or at a compromise position between the student's viewpoint and the simulated center of gravity.

Figures 3A, 3B, 3C, 7A, 7B:
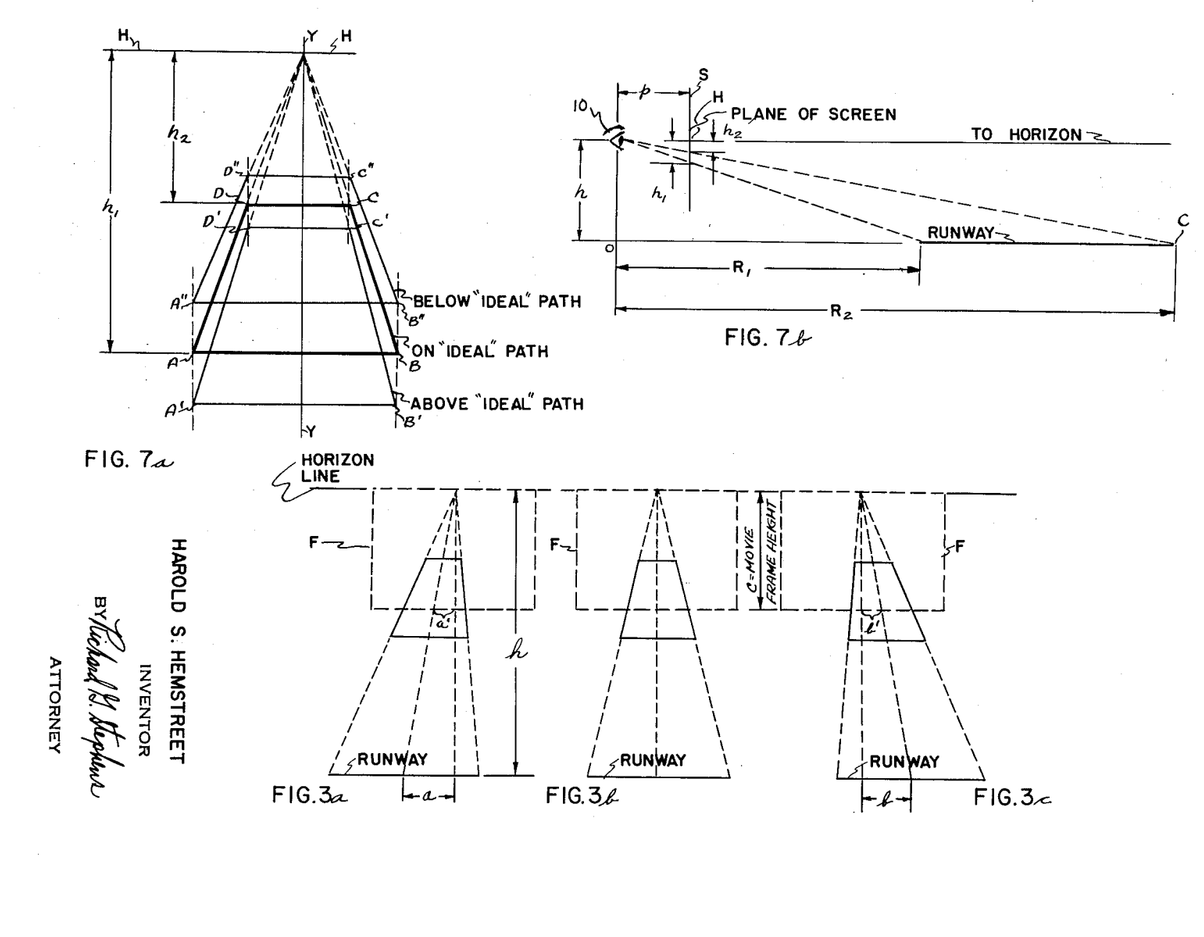
FIGS 3a, 3b and 3c are diagrams illustrating the appearance of a rectangular grounded surface from three different viewpoints, useful in understanding the operation of the invention.
FIGS. 7a and 7b are diagrams representing, respectively, perspective front views and a side view of a typical aircraft approach path, the diagrams being useful in comprehending the nature of vertical distortion provided by my invention to simulate deviations in altitude.

Referring to FIG. 7a there is shown in heavy lines a trapezoidal or keystone shaped area ABCD which is the appearance in perspective a rectangular grounded surface such as an airport runway might have at a particular point along a reference or ideal approach or glide path preparatory to landing an aircraft. Being symmetrical about the centerline Y—Y, the shape is such as that seen as a pilot approaches the runway on a line which is an extension of the centerline of the runway. Also shown in FIG. 7a are a shape A'B'C'D' representing the shape the same rectangular grounded surface might have if viewed from a point above the aforementioned particular point, and a shape A"B"C"D" representing the same rectangular grounded surface as viewed from a point below the aforementioned particular point. In FIG. 7a line H—H represents the horizon. Referring now to FIG. 7b there is shown a side elevation view of the ideal approach path and runway, with the eye 10 of the pilot situated a distance $h$ above ground or runway level, distance $h$ being the instantaneous flight altitude. It will be seen that if a screen S is placed a distance $p$ in front of the viewpoint that the scene presented to the pilot may be simulated by projection of a suitable scene onto screen S. Assuming that screen S is mounted in a generally vertical position, it may be seen that for realistic presentation that the distances of objects below the horizon line on the screen must be inversely proportional to the horizontal distance between those points and the ground position of the viewpoint. For example, the distance $h_1$ on the screen between the horizon and the near end of the runway is inversely proportional to $R_1$, the horizontal distance between the aircraft viewpoint 10 and the actual near end of the runway, or as may be seen by similar triangles:

$$h_1 = h\frac{p}{R_1}$$

Similarly, the distance $h_2$ on the screen between the horizon and the far end of the runway C is inversely proportional to $R_2$, the horizontal distance between the viewpoint 10 and the actual far end of the runway C, or that:

$$h_2 = h\frac{p}{R_2}$$

It may now be appreciated that for a particular point along an approach or glide path, that increases in altitude require proportionate increases in distances $h_1$ and $h_2$ of such a simulated runway projected upon a screen, and that conversely, decreases in altitude require proportionate decreases in distances $h_1$ and $h_2$ of a simulated runway picture. Thus variations in altitude above and below an ideal approach path require that projected pictures of a ground scene taken during such an ideal path must be uniformly "stretched" or "squeezed" in the vertical direction with respect to the horizon line. This may also be made apparent by reference to FIG. 7a.

In my invention the abovementioned vertical expansion or contraction may be accomplished as by means of an anamorphic adapter having a variable angular magnification ratio. The invention contemplates providing an object having the appearance of a grounded area such as by making a conventional motion picture of a reference approach path and landing. A camera may be mounted near the pilot's seat of an actual aircraft, pointed to cover the area seen by the pilot, and operated as a skilled pilot makes an ideal approach and landing, operating the aircraft from the co-pilot's station. Since it may be inconvenient to measure accurately the position of the aircraft, such a motion picture also may be made by moving the camera in relation to a model ground scene according to the motion of an actual aircraft making a landing. Such a moving picture when simply and directly projected will merely portray a picture seen during an ideal landing. By use of the anamorphic adapter means are provided to expand or compress the scene projected in accordance with simulated deviations from an ideal flight path so as to present a realistic scene of incorrect as well as correct or ideal simulated landings. Since it may be deemed preferable to utilize an anamorphic adapter having an angular magnification ratio which is always greater than unity (for example, 1.0 to 2.0) it may sometimes be desirable to photograph the ideal approach path with the anamorphic adapter attached to the camera and set in its mean position. A distorted motion picture would be produced, but by utilizing the same adapter setting upon projecting the picture, the distortion would be entirely eliminated in the projected picture. Then, by deviating the anamorphic adapter setting from its mean position in accordance with deviations of a simulated flight above and below the ideal approach path, the undistorted picture may be compressed or expanded vertically to provide a realistic picture of an aircraft approach and landing.

Figure 2A:
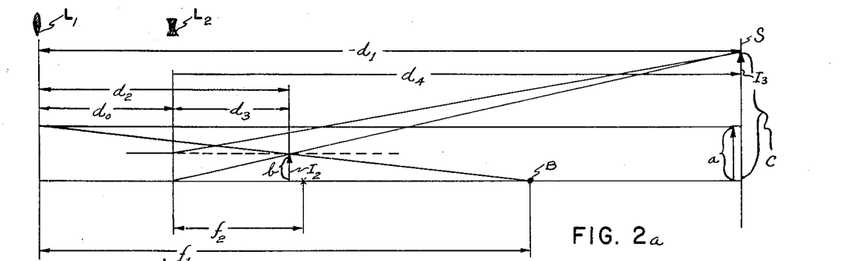
FIG. 2a is an optical ray diagram illustrating the operation of a positive and a negative lens.

The operation of a variable anamorphic adapter will now be explained. Referring to the ray diagram of FIG. 2a, assume that a beam of light is projected from the left from a conventional motion picture projector toward screen S so that the beam would form an image having a height "$a$" if allowed to pass uninterrupted to the screen. If a cylindrical positive lens $L_1$ and a cylindrical negative lens $L_2$ are interposed between the beam and screen S, the beam will be converged by positive lens $L_1$ to form a "virtual object" $I_2$ (having a height "$b$") for negative lens $L_2$, which diverges the beam, casting an enlarged image $I_3$ (having a height "$c$") on screen S. The vertical magnifications $M_1$ and $M_2$ of lenses $L_1$ and $L_2$ may be expressed as:

$$M_1 = \frac{b}{a}$$

$$M_2 = \frac{c}{b}$$

The total system vertical magnification $M_t$ is thusly $$\frac{b}{a} \times \frac{c}{b} = \frac{c}{a}$$

By similar triangles it may be seen that:

$$M_1 = \frac{b}{a} = \frac{d_2}{d_1} \quad (1)$$

where $d_1$ and $d_2$ are, respectively, the negative object distance and the image distance of lens $L_1$, and that:

$$M_2 = \frac{c}{a} \frac{d_4}{d_3} \quad (2)$$

where $d_3$ and $d_4$ are, respectively, the object distance and image distance of lens $L_2$.

Applying to lenses $L_1$ and $L_2$ the law that the reciprocal of object distance plus the reciprocal of focal length equals the reciprocal of image distance, $$\frac{1}{d_2} - \frac{1}{d_1} = \frac{1}{f_1} \text{ or } \frac{d_2}{d_1} = \frac{f_1}{d_1 + f_1} \quad (3)$$

and $$\frac{1}{d_4} - \frac{1}{d_3} = \frac{1}{-f_2} \text{ or } \frac{d_3}{d_4} = \frac{f_2}{d_4 + f_2} \quad (4)$$

where $f_1$ and $f_2$ are the focal lengths of lenses $L_1$ and $L_2$, respectively.

From Equations 2 and 4:

$$M_2 = \frac{d_4}{d_3} = \frac{d_4 + f_2}{f_2} = \frac{d_1 - d_0 + f_2}{f_2} \quad (5)$$

and the total vertical magnification may be expressed as:

$$M_t = \frac{d_2}{d_1} \times \frac{d_4}{d_3} = \frac{f_1}{d_1 + f_1} \times \frac{d_1 - d_0 + f_2}{f_2} \quad (6)$$

If distance $d_1$ to the screen is very great compared to $d_0$, $f_1$ and $f_2$ (as it ordinarily will be in practical projection systems), Expression 6 may be reduced to:

$$M_t \approx \frac{f_1}{f_2} \quad (7)$$

For sake of clarity and simplicity of explanation, simplified Expression 7 will be utilized in further describing the invention. Thus it will be seen from Expression 7 that the system vertical magnification may be varied by varying the focal length of either lens $L_1$ or lens $L_2$. Since lenses $L_1$ and $L_2$ comprise cylindrical rather than spherical lenses, it will be appreciated that the system magnification will be varied in a vertical direction only as viewed in FIG. 3a as the focal length of one of the lenses is varied, and that in a horizontal sense the image from the projector will be unaffected, and will remain in focus on the screen.

Figure 2B:
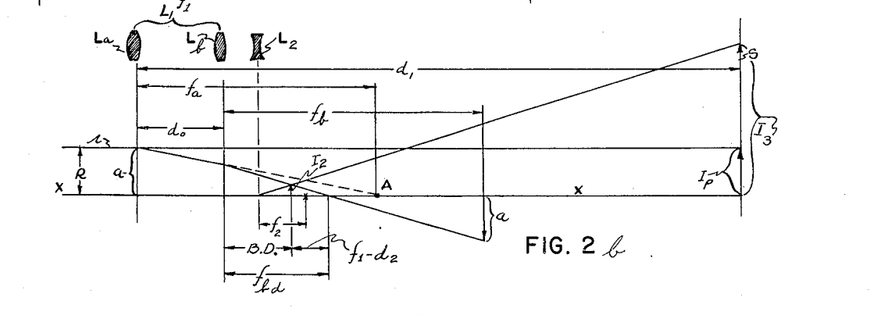
FIG. 2b is an optical ray diagram of an anamorphic distorting means such as may be utilized in practising the invention.

In order to provide a lens of variable focal length, either lens $L_1$ or $L_2$ may be constructed as a composite lens, having two or more elements axially movable with respect to each other. Referring to FIG. 2b there is shown a ray diagram illustrating the operation of a composite positive lens $L_1$ comprised of two positive lens elements $L_a$ and $L_b$, both of which are cylindrical lenses and which are movable along the system optical axis X—X. As is well-known in the optical arts, the equivalent focal length $f_1$ of a pair of thin lenses may be expressed as:

$$f_1 = \frac{f_a f_b}{f_a + f_b - d_0} \quad (8)$$

where $f_a$ and $f_b$ equal the focal lengths of the individual lenses and $d_0$ equals the separation between the lenses. Thus it may be seen that the focal length of composite lens $L_1$ may be varied to vary the overall system vertical angular magnification by varying $d_0$, the distance between elements $L_a$ and $L_b$ of composite lens $L_1$. Substituting Expression 8 into Expression 7, it may be seen that the overall system vertical angular magnification of composite lens $L_1$ and lens $L_2$ may be expressed as:

$$M_t = \frac{f_a f_b}{f_2 (f_a + f_b - d_0)} \quad (9)$$

To more fully understand the operation of composite lens $L_1$ one may trace a ray $r$, which is directed toward the tip of image $I_p$ on screen S from a conventional projection system toward the two cylindrical positive lens elements $L_a$ and $L_b$. The beam is converged by lens $L_a$ toward focal point A of lens $L_a$, and further converged by lens $L_b$ to provide an image $I_2$ as shown. The focal lengths of cylindrical positive lenses $L_a$ and $L_b$ are shown as $f_a$ and $f_b$, respectively. By similar triangles the following expressions may be derived:

$$\frac{a-b}{a}=\frac{d_0}{f_a} \text{ or } \frac{b}{a}=\frac{f_a-d_0}{f_a}$$

and $$\frac{b}{a}=\frac{b}{a'}=\frac{f_{bd}}{f_b-f_{bd}}=\frac{f_a-d_0}{f_a}$$

$$f_a f_{bd} = f_a f_b - f_{bd} f_a - f_b d_0 + f_{bd} d_0$$

$$f_{bd}(f_a + f_a - d_0) = f_b(f_a - d_0)$$

$$f_{bd} = \frac{f_b(f_a - d_0)}{2f_a - d_0} \quad (10)$$

where $f_{bd}$, which may be designated the "back focal distance," is the distance from the focal point B of the composite lens to the vertex of the second element $L_b$. The object distance $d_1$ for composite lens $L_1$ will be equal to $-d_7$, the distance from the first principal point $(L_a)$ of the composite lens to the screen S, upon which beam R is in focus in the horizontal direction. Applying the general lens law to composite lens $L_1$, $$\frac{1}{f_1}=\frac{1}{-d_1}+\frac{1}{d_2} \text{ or } d_2 = \frac{f_1 d_1}{f_1 + d_1} \quad (11)$$

where $d_2$ is the image distance. Having located image distance $d_2$, composite focal length $f_1$, and back focal length $f_{bd}$, the distance BD between lens $L_b$ and image $I_2$ (which may be termed the "back image distance") may be determined.

$$BD = f_{bd} - (f_1 - d_2) \quad (12)$$

Substituting Expression 11 into Expression 12 and rearranging:

$$BD = \frac{f_b(f_a - d_0)}{2f_a - d_0} - \frac{f_1^2}{f_1 + d_1} \quad (13)$$

Substituting Expression 8 for $f_1$ into Expression 13 the following is obtained:

$$BD = \frac{f_b(f_a - d_0)}{2f_a - d_0} - \frac{\frac{f_a^2 f_b^2}{f_a + f_b - d_0}}{f_a f_b + f_a d_1 + f_b d_1 - d_1 d_0} \quad (14)$$

As the separation $d_0$ between the elements $L_a$ and $L_b$ of composite lens $L_1$ is varied to vary the vertical angular magnification of the system, these elements may also both be moved relative to negative lens $L_2$ in accordance with Expression 14 so that the image formed by composite lens $L_1$ remains fixed axially with respect to negative lens $L_2$. This will maintain the image on screen S in proper focus vertically at all times as vertical angular magnification is varied. Thus it will be seen that by proper axial movement of two cylindrical lenses of the anamorphic adapter a film image may be projected with variable vertical magnification.

Referring to FIG. 3 there are shown the appearances of a rectangular grounded surface such as an airport runway under each of three different circumstances. FIG. 3b illustrates the scene which might be viewed as an aircraft approaches the runway directly in line with the runway center line. FIG. 3a illustrates the scene as viewed when an aircraft is displaced a distance "a" to the right of the runway center line, and FIG. 3c the scene during a similar lateral displacement "b" to the left of the runway center line. Superimposed upon each portion of FIG. 3 in dashed lines is a rectangle F representing one frame of a motion picture which might be used to project the scene viewed as a pilot flies an approach path. It may be seen from similar triangles that the displacements $a'$ and $b'$ of the center-line on the film at the lower edge of the film frame from the center of the film frame are proportional to the ratio of the lateral displacement of the aircraft to the altitude of the aircraft. If the pictures are taken so that the horizon is located along the upper edge of the frame, then the lateral displacement of the picture at any point from a given lateral displacement in the approach path is proportional to the distance from that point to the top of the frame. If the actual camera utilized causes an inversion of the picture, it will be apparent that the "top" and "bottom" of the film frame are correspondingly inverted in the above analysis. Thus it may be seen that by providing distortion of a film projection varying in accordance with the magnitude of deviation from a centered glide path, and varying linearly from zero distortion at a horizon point to maximum distortion at a point representing a nearest location, that a scene varying in accordance with lateral displacement from a reference ideal or centered approach may be projected.

Referring to FIG. 4a there is shown a plain slab 30 of optical material such as glass having a single ray R of light entering it at an angle $\phi$ with respect to the normal. Since the sides 31, 32 of the slab 30 are parallel the emergent ray R' is parallel to the entering ray R but displaced an amount $d_d$. The displacement may be expressed as:

$$d_d = t \sin \phi \left(1 - \frac{n}{n'}\right) \frac{\cos \phi}{\cos \phi'} \quad (3)$$

where:

$t$ = thickness of the slab
$\phi$ = angle of incidence of entering ray
$n$ = index of refraction of air (unity for practical applications)
$n'$ = index of refraction of the optical material of the slab
$\phi'$ = angle of refraction within the slab For small angles of incidence it will be seen that Expression 3 will reduce to:

$$d_d \approx t\phi \quad (4)$$

so that for small angles of incidence the displacement is proportional to the product of glass thickness and angle of incidence $\phi$. Now assume that a ray R' of light strikes prism or wedge 107, which is shown in elevation in FIG. 4b as having a linearly varying thickness. If ray R' strikes normal to the surface 34 of prism 107 in a horizontal sense (parallel to the plane of the drawing), the ray will emerge refracted upwardly as shown, but undeviated laterally. If wedge 107 is rotated about vertical axis 109 so as to change the horizontal angle of incidence of ray R' on surface 34, the emergent ray will be displaced laterally as well as deviated upwardly. The amount of lateral deviation or displacement will be commensurate with the amount the wedge has been rotated from its mean or normal position as explained in connection with FIG. 4a. Similarly, a ray R" which strikes surface 34 will be deviated upwardly, will be deviated laterally if normal to surface 34 in a horizontal sense, and will be displaced laterally as prism 107 is rotated about axis 109. Rays passing through the lower portion of wedge 107 will be displaced less than those passing through the upper portion of wedge 107 since the displacement is proportional to glass thickness. Since wedge 107 is provided with a linearly varying thickness, it will be apparent that the horizontal displacement of portions of a picture passing through wedge 107 will vary linearly from zero at the lower edge of prism 107 to a maximum at the upper edge of prism 107, the amount of such displacement at each portion of the picture being proportional to the angle through which prism 107 has been rotated from a mean position. If a similar but stationary prism or wedge 108 is disposed near wedge 107 and provided with an oppositely varying thickness as shown, the vertical deviation of the picture may be cancelled out, so that the rays emerging from wedge 108 will be parallel in a vertical sense to those entering wedge 107, but will be deviated laterally in accordance with the rotation of wedge 107 in amounts varying from zero at the bottom of the wedges to a maximum at the top. Thus it may now be understood that if an image from a projector is applied to the wedge combination with the portion of the picture corresponding to the horizon passing through the thin portion of wedge 107, that the displacements of the portions of the projected image will vary in accordance with their distance from the horizon, and if wedge 107 is rotated so as to vary the angles of incidence, the magnitudes of the displacement will vary, to provide linear lateral distortion as required for simulation of lateral displacement from an ideal approach path. For convenience, such distortion may be termed "shear distortion," it being analogous to the distortion caused by applying pure shear forces to an elastic member.

Since no lateral displacement should be applied to those portions of the picture representing the horizon, it will become apparent that wedge 107 should taper to "zero thickness" at its lower edge. While I may utilize a wedge 107 having extremely little thickness at its lower edge, such wedges are difficult to construct, and hence it is deemed more desirable in some embodiments of the invention to provide a plane slab such as 38 (shown in exaggerated thickness in FIG. 4b) which is rotatable about a vertical axis 39. By simple mechanical connection (not shown) to shaft 109 of prism 107, slab or plate 38 may be rotated from a mean position normal to the optical axis about axis 39 in a direction opposite to the direction of rotation of prism 107. Such opposite rotation will be understood to produce horizontal displacement in the opposite direction to that produced by prism 107, and by providing slab 38 with a thickness equal to the minimum desired thickness at the lower edge of wedge 107, wedges having a finite thickness may be utilized in practicing the invention.

Figure 5:
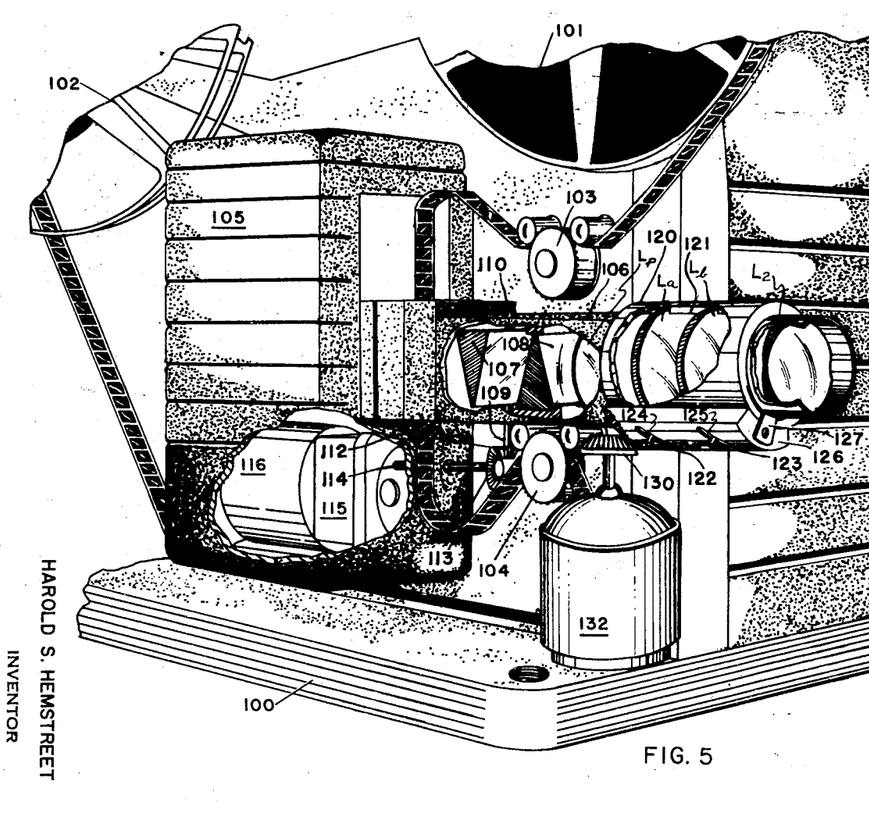
FIG. 5 shows in detail an exemplary embodiment of a projector of my invention, in which a motion picture prejector is provided with attachments explained in FIGS. 2, 3 and 4 for distorting the picture beam projected from the projector.

Referring now to FIG. 5 there is shown a complete projection attachment which may be utilized in practicing my invention. A conventional motion picture projector indicated generally comprises a base 100, a film feed reel 101, a film take-up reel 102, film drive spools 103, 104 and associated conventional apparatus. The projector may be completely conventional in most respects, but preferably is provided with a film drive capable of reverse as well as forward operaiton, and a variable speed position servomotor (not shown) is provided for operating the film drive, the shutters, or the prisms of a continuous projection system. Mounted with housing 105 are a conventional projection light source and condensing system (not shown). The apparatus described serves to project a picture of the ideal or reference takeoff or landing contained on the film. Disposed within housing 106 (which is attached rigidly to the projector) are optical wedges or prisms 107 and 108, which are shown having exaggerated thickness, and which are axially aligned optically with the projection system described. Wedges 107 and 108 are each tapered linearly in a vertical direction. Wedge 107 is mounted upon shaft 109 and bearing 110, allowing limited rotation of wedge 107 about a vertical axis normal to and intersecting the projection optical axis. The lower end of shaft 109 is fitted with a bevel gear 112, which meshes with cooperating gear 113. Motor 116 drives shaft 114 and gear 113 through speed reducer 115, and hence it may be seen that rotation of motor 116 serves to rotate wedge 107, varying the angle of incidence of light rays projected from the film. Wedge 108 is rigidly attached to housing 106. It will be recalled from the explanation of FIG. 4 that "shear" distortion, or distortion varying in magnitude linearly from top to bottom may be effected by providing a linearly tapered wedge or prism. The amount of shear distortion was shown to be commensurate with the angle of incidence of the light striking the wedge. Thus it may be seen that angular rotation of wedge 107 by means of motor 116 will serve to vary the shear distortion of the image projected from the film.

A plane slab (not shown) such as slab 38 of FIG. 4b may be rotatably mounted within housing 106 on a vertical shaft (not shown) geared to shaft 109 to be oppositely rotated if it is desired that wedge 107 taper to an edge of finite thickness. Provided near the outer end of housing 106 is a conventional projection lens $L_p$, which receives the image projected through the wedges shown and projects toward the screen through an anamorphic distorting means presently to be described.

Axially attached to housing 106 is lens barrel 120, which contains two positive cylindrical lenses $L_a$ and $L_b$, and a negative cylindrical lens $L_2$. Positive lenses $L_a$ and $L_b$ are axially movable within lens barrel 120 but prevented from rotating such as by keyway 121. Each of this pair of positive lenses is axially slidable within barrel 120 by movement of rods 122 and 123 which are rigidly attached to lenses $L_a$ and $L_b$ respectively. Rods 122 and 123 project outwardly from lens barrel 120 through longitudinal slots (not shown) in the lens barrel to cooperate with shaped slots 124 and 125 of cam block 126, which is axially rotatable around lens barrel 120. Cam block 126 is rotatably attached to lens barrel 120 by means of pivot arm 127, which retains cam block 126 on lens barrel 120 while allowing limited rotation of cam block 126 about the optical system axis. The left hand edge of cam block 126 is provided with a toothed surface which engages bevel gear 130. Motor 132 serves to rotate bevel gear 130, rotating cam block 126, slots 124 and 125 thereby moving rods 122 and 123 axially so as to cause axial positioning of lenses $L_a$ and $L_b$. As discussed above in relation to FIG. 2, the vertical magnification of the system may be varied by varying the spacing between lenses $L_a$ and $L_b$, and by appropriately varying the back image distance from lens $L_2$ the projected image will be kept in focus vertically on the projection screen. The magnification will vary in accordance with lens separation according to Expression 9 given above, and the required movement of both lenses $L_a$ and $L_b$ to maintain the image formed by the composite pair at the correct distance from lens $L_2$ as lens separation is varied is given in Expression 14 above. When plotted for various distances of lens separation both of these expressions yield smoothly varying curves, enabling simple non-linear cam slots 124 and 125 to provide correct axial positioning of the lens elements. The horizontally distorted image applied to projection lens $L_p$ is focused in a horizontal sense on screen S by the projection lens. The anamorphic distorting means comprising lenses $L_a$, $L_b$ and $L_2$ maintain the image in vertical focus while varying vertical magnification as described above.

Figure 6:
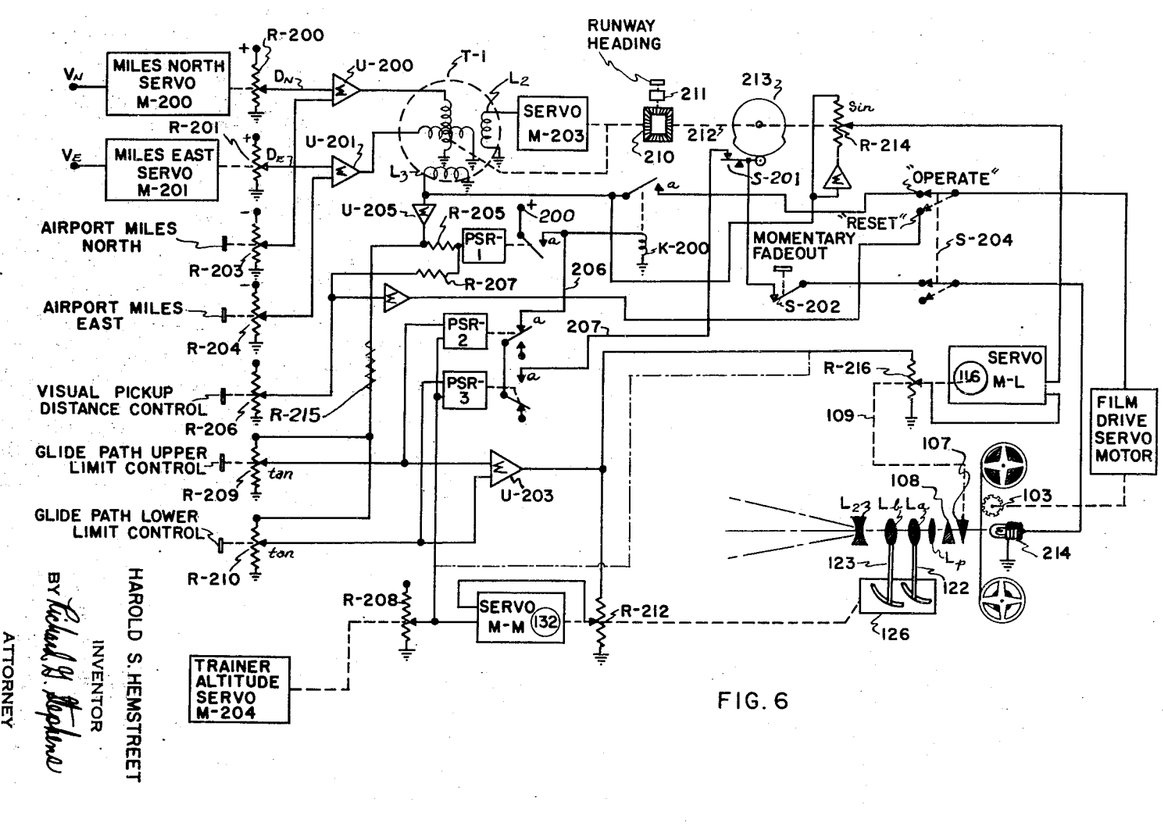
FIG. 6 is a schematic diagram illustrating how the apparatus of my invention may be interconnected with the apparatus of a conventional grounded aircraft trainer.

Shown in FIG. 6 is a control system illustrating how the above described apparatus may be interconnected with a conventional grounded trainer so as to provide realistic visual simulation of takeoffs and landings. Modern grounded aircraft trainers are commonly provided with integrating or velocity servos which are responsive to potentials representing components of simulated ground speed in two directions, usually northerly and easterly, and which servos integrate the component potentials with respect to time, producing as shaft outputs quantities representing simulated aircraft distances with respect to a reference point on the ground. A recording pen is commonly actuated by such shaft outputs to trace the course of simulated flight on a map for observation by an instructor. In the invention servos M-200 and M-201 may comprise such integrating servos. Servo M-200, the position of which represents the distance of the simulated aircraft north of the reference point, positions the arm of potentiometer R-200, the winding of which is excited with a constant excitation from the conventional grounded trainer computer power supply, deriving a potential commensurate with "miles north" of the simulated aircraft from the reference point, which potential ($D_n$) is applied to summing amplifier U-200. Servo M-201 and potentiometer R-201 similarly derive a "miles east" potential ($D_e$) which is applied to summing amplifier U–201. Potentiometers R–203 and R–204 are provided with control knobs manually positionable by the instructor so that the arms of potentiometers R–203 and R–204 may be positioned in accordance with a desired northerly distance and a desired easterly distance respectively of a simulated air port from the reference point. The windings of potentiometers R–203 and R–204 are excited from the computer alternating voltage power supply with potentials opposite in sense to those applied to excite potentiometers R–200 and R–201. Since the station distance output potentials from potentiometers R–203 and R–204 are applied in opposite sense to the aircraft distance potentials to summing amplifiers U–200 and U–201, it will be seen that the difference output potentials from the amplifiers will represent northerly and easterly distance respectively of the instantaneous flight position of the simulated aircraft from the selected airport location. These difference potentials are each applied individually to one rotor coil of a conventional induction resolver T–1. The resultant voltage induced in coil $L_2$ of resolver T–1 is applied to a conventional servo M–203, the output shaft of which rotates the rotor coils of the resolver so as to diminish the voltage in coil $L_2$, and thusly balances so that the output shaft position of servo M–203 represents the angle between the resultant distance between the simulated aircraft and airport and north reference direction. At balance the potential induced in coil $L_3$ will be a mixmum, and will be proportional to the resultant distance $D_r$ between the simulated aircraft and the selected simulated airport site. The resultant distance potential is applied via summing amplifier U–205 and scaling resistor R–205 to a polarity sensitive relay means PSR–1. Potentiometer R–206 is excited by a constant potential of opposite sense, and its arm is positioned by the instructor in accordance with the maximum distance at which it is desired that the trainee be provided with a visual picture of the landing field. A potential is thereby applied to polarity-sensitive relay means PSR–1 via resistor R–207. When the simulated aircraft is at a distance exceeding that selected by potentiometer R–206, the potential to PSR–1 via resistor R–205 will exceed that through resistor R–207, and contact "a" of PSR–1 will remain open. When simulated aircraft distance becomes less than the distance selected by positioning of potentiometer R–206, the polarity of the resultant potential applied to relay PSR–1 will reverse, causing relay PSR–1 to close its contact "a."

The conventional grounded trainer altitude servo M–204 positions the arm of potentiometer R–208, applying a potential commensurate with instantaneous altiude of simulated flight to polarity sensitive relays PSR–2 and PSR–3. Provided for operation by the instructor are potentiometers R–209 and R–210, which may be set to correspond respectively to the upper and lower limits of the allowable altitude in which the student must fly in order to be presented a visual presentation of the simulated aircraft. Since allowable altitude for allowable glide paths depends upon the distance $D_r$, this potential is applied to excite potentiometers R–209 and R–210. These potentiometers are provided with tangent function windings, so that the output potentials appearing on their wiper arms represent respectively the maximum and minimum altitudes at which the simulated aircraft must be situated at any particular distance from the station if a visual image is to be presented. The maximum allowable altitude potential from potentiometer R–209 is applied to relay PSR–2, and the minimum allowable altitude potential from potentiometer R–210 is applied to relay PSR–3. As the altitude of simulated flight exists between the upper and lower limits selected by positioning potentiometers R–209 and R–210, the "a" contacts of both relays PSR–2 and PSR–3 will be closed. If the simulated flight altitude decreases below that selected by potentiometer R–210, the polarity of the resultant potential applied to relay PSR–3 will reverse, and contact "a" of relay PSR–3 will open. Conversely, if simulated flight altitude increases above that selected by potentiometer R–209, the polarity of the resultant potential supplied to relay PSR–2 will reverse, opening contact "a" of relay PSR–2. Thus a complete circuit from conductor 206 to conductor 207 exists only when the altitude of simulated flight is maintained between the limits imposed by the instructor by the settings of potentiometers R–209 and R–210.

It will be recalled that the output shaft position of servo M–203 represents the simulated aircraft to airport bearing angle (i.e., angle between "north" and a line between the aircraft and the airport). The output shaft position of servo M–203 is applied as one input to differential 210. Applied as another input to differential 210 is a shaft rotation selected by the instructor in accordance with the desired heading of the runway at the simulated airport. The runway heading input shaft is manually positioned by the instructor and retained in position by friction means indicated generally as 211. Thus it will be seen that the position of output shaft 212 of differential 210 will be commensurate with the difference between aircraft to station bearing and runway heading. Shaft 212 positions cam 213 which operates switch S–201. Cam 213 is provided with a rise along a portion of its periphery corresponding to twice an arbitrary maximum allowable amount that trainer to station bearing may be allowed to deviate from runway heading. Cam 213 is shown in a position corresponding to direct alignment of the aircraft to station bearing with the runway heading, the cam follower of switch S–201 being centered on the cam rise. If the simulated aircraft approaches the simulated airport at such a bearing that cam 213 no longer closes switch S–201, no visual display will be presented to the student. If a constant potential is applied to terminal 200, it will now be understood from the above explanation that the potential will be applied via contact "a" of relay PSR–1 if the simulated aircraft is within suitable distance of the simulated airport, via conductor 206, via contacts "a" of relays PSR–2 and PSR–3 if the simulated aircraft is within suitable altitude limits, via conductor 207 and via switch S–201 if the simulated aircraft is approaching from a suitable direction, via a normally closed switch S–202 to energize the lamp 214 of the projector. If the student operates the simulated controls so as to exceed any of the allowable limits, projection lamp 214 will be de-energized, and no airport picture will be cast upon the screen.

The upper and lower altitude limit potentials derived by potentiometers R–209 and R–210 are applied to summing amplifier U–203 which thusly provides an output potential according to the average of such altitude limits, such output potential thereby representing the ideal altitude for a particular point along an approach path. The actual altitude potential derived by potentiometer R–208 is applied as an input potential to servo M–M, which includes servomotor 132. The ideal altitude potential from amplifier U–203 is applied to excite the winding of potentiometer R–212, the arm of which is positioned by motor 132. The potential on the arm of potentiometer R–212 is applied as a follow-up or rebalancing potential to servo M–M, so that the output shaft position of motor 132 represents the ratio of aircraft simulated altitude to ideal altitude. This ratio is a measure of the required vertical angular magnification as shown above, and hence the shaft of motor 132 may be connected to cam block 126 to axially position lenses $L_a$ and $L_b$.

The aircraft to airport distance potential on coil $L_3$ of resolver T–1 is also applied to excite the windings of sine resolver R–214, which is shown schematically as a simple potentiometer but which may actually comprise a resolver capable of 360 degrees rotation. The arm of resolver R–214 is positioned by the output shaft 212 of differential 210 in accordance with angular difference between trainer to station bearing and runway heading, so that the potential appearing on the arm of resolver R–214 is proportional to the lateral displacement of the simulated aircraft from the airport runway centerline extended. The lateral displacement potential is applied as input to servo M–L, which includes servomotor 116. Follow-up or rebalancing voltage for servo M–L is derived from potentiometer R–216, the winding of which is excited by the ideal altitude potential output from amplifier U–203, thereby providing an output shaft position from motor 116 commensurate with the ratio between lateral displacement from an ideal glide path and altitude. As explained above, such quantity is that required for angularly positioning optical wedge 107. Relay K–200 will be seen to be energized whenever relay PSR–1 closes its contact "a," which will occur whenever the simulated aircraft comes within a selected distance of the simulated airport. As relay K–200 closes its contact "a," the distance potential will be applied via the "Operate" contact of switch S–204 to the film drive servomotor, a conventional position servomotor, causing film to be run through the projector at the rate at which the simulated aircraft approaches the simulated airport. It may be noted that the film drive will start as soon as the simulated aircraft reaches a minimum distance from the simulated airport, regardless of whether the trainer is being operated by the student so as to be within allowable altitude and direction limits. Since the film has been taken during a particular or ideal landing, each frame on the film will represent a particular distance from the airport, and hence it is important that the film drive be actuated accurately in accordance with simulated distance from the airport. If the student operates the controls so as to come within the altitude and direction limits after the film drive has been operating, the proper film frame will be in the projector, so that a realistic picture may be projected immediately as the projection lamp becomes illuminated. After a simulated landing has been made and most of the film has been run, the instructor may reload the projector by moving switch S–204 to its "Reset" position. This applies a potential commensurate with the maximum visual pickup distance selected by potentiometer R–206 to the film drive servomotor, causing reverse feed of the film until the film is again in its original position. The lower arm of switch S–204 disconnects the projection lamp when the film is being run in reverse. Momentary fadeout switch S–202 may be manually operated by the instructor to cause temporary loss of the picture to simulate varying visibility conditions. Simulation of such conditions are useful in teaching proper techniques in transferring from instrument flying to contact flying. It will be apparent that simulation of aircraft takeoffs may be accomplished in the same manner as landings, by providing a film bearing photographs of an ideal or reference takeoff. In such systems, the picture may be removed from the screen by de-energizing the projection lamp after the simulated aircraft has traveled an arbitrary distance. In the apparatus of FIG. 6 alternating voltage analogue computer techniques have been utilized, but it will be apparent to those skilled in the art that direct current equipment may be readily substituted. Since the techniques of parallel and series addition are well-known, summing and scaling resistors have been omitted from the input circuits of the summing amplifiers, servoamplifiers, and most of the other apparatus. It will be understood that the film drive servomotor is provided with a conventional follow-up potentiometer (not shown) to enable the servomotor to position the film according to simulated aircraft distance from the simulated airport.

In FIG. 6 maximum and minimum allowable altitude potentials are continuously summed in amplifier U–203 to provide an "ideal" or reference altitude signal as distance from the airport decreases or increases. If the windings of potentiometers R–209 and R–210 are strictly tangent function windings, excitation of such windings by the aircraft-to-airport distance potential from amplifier U–205 will provide linearly decreasing potential outputs from the potentiometers as the simulated aircraft approaches the simulated airport at a constant rate, providing a linearly decreasing reference altitude potential output from amplifier U–203. If the object utilized to project images of the reference area comprises a motion picture film taken during an actual flight as mentioned above, it may be desirable to provide a reference altitude potential which does not decrease linearly as the aircraft approaches the airport, since it is practically impossible in many aircraft to maintain a glide path of constant slope down to ground altitude, it being necessary to "level off" shortly before touchdown. Hence it may be desirable to provide reference glide paths which change in slope in accordance with distance from the airport reference point. This may be done in a variety of ways by providing non-linear translating means between the distance potential at amplifier U–205 and the ideal altitude potential at amplifier U–203. For example, a non-linear resistance may be inserted as shown in dashed lines as resistor R–215. The reference path also may be made non-linear in a horizontal sense, if desired, though this is usually unnecessary, since most aircraft may easily be flown in a straight line down the center of an airport runway while the motion pictures are taken.

Figure 9:
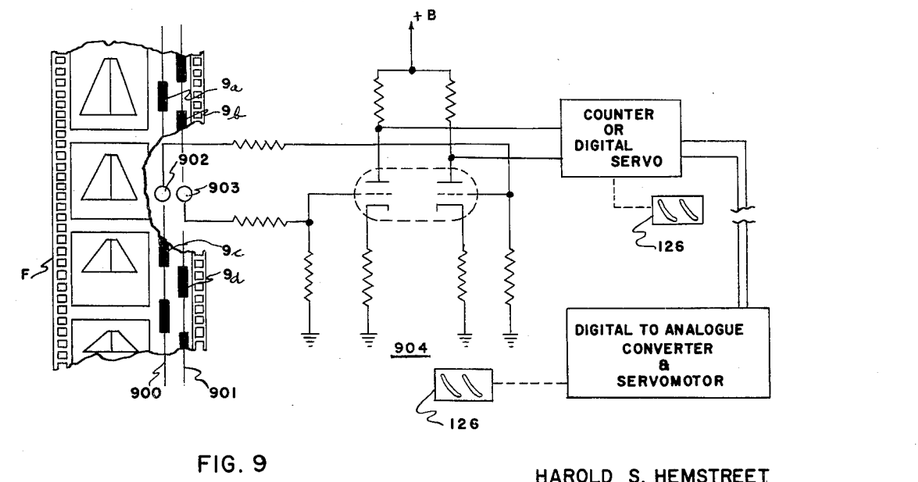
FIG. 9 illustrates schematically a portion of an alternative embodiment of the invention in which a motion picture film is coded with indicia for operating a portion of the invention in a more accurate alternative manner.

In some embodiments of the invention it is deemed preferable to control ideal or reference altitude by digital means to provide very accurate control of the vertical distorting means and the film feed. Shown schematically in FIG. 9 is apparatus which may be utilized in conjunction with that already shown to provide such control. Provided on the motion picture film F are two coding tracks 900 and 901 upon which may be coded indicia to operate the vertical distortion means as the film is fed through the projector. Photocell pickups 902 and 903 are aligned with tracks 900 and 901, respectively, so that electrical signal pulses will be applied to amplifier 904 as film F is fed through the projector and code marks such as 9a, 9b, etc. pass over the photocells. As in conventional motion picture sound systems, a light source (not shown) is provided on the opposite side of film F from the photocell cathodes. The output currents from photocells 902 and 903 are shaped and amplified by a conventional dual triode amplifier 904 to provide suitable signals for operating a pulse counter shown in block form. It may be noted that code marks 9a and 9b are vertically displaced relative to each other, so that photocell 903 would be pulsed before photocell 902 if film F were fed downwardly, and photocell 902 would be pulsed before photocell 903 if film F were fed upwardly. Hence the system shown is reversible. The amplified output potentials from amplifier 904 consist of pulses phased in accordance with film feed direction. These output potentials may be counted in a pulse counter such as the counter shown in application Serial Number 454,292 filed September 7, 1954, by John Kaufmann and assigned to the same assignee as the present invention. The count present in the counter may be converted to an analogue potential as by means of the apparatus shown in United States Patent No. 2,881,418 which was granted on April 7, 1959, to Stephens and Hayes and is owned by said assignee, and the analog signal may be utilized to position servomotor 132. The analogue potential may also be compared with the simulator altitude potential from potentiometer R–208 (FIG. 6) to disconnect the projection lamp 214 when the simulated aircraft deviates beyond allowable altitude limits. Such a system eliminates the need for the manual glide path limit controls, but results in only analogue accuracy. If the pulses from amplifier 904 are utilized to position a digital servo which is connected to position cam block 126, the vertical distortion may be controlled with digital accuracy as simulated flight progresses. Film feed may also be controlled with great accuracy by converting the distance potential from amplifier U–205 (FIG. 6) to a digital signal to position a digital film drive servo.

Figures 8A, 8B:
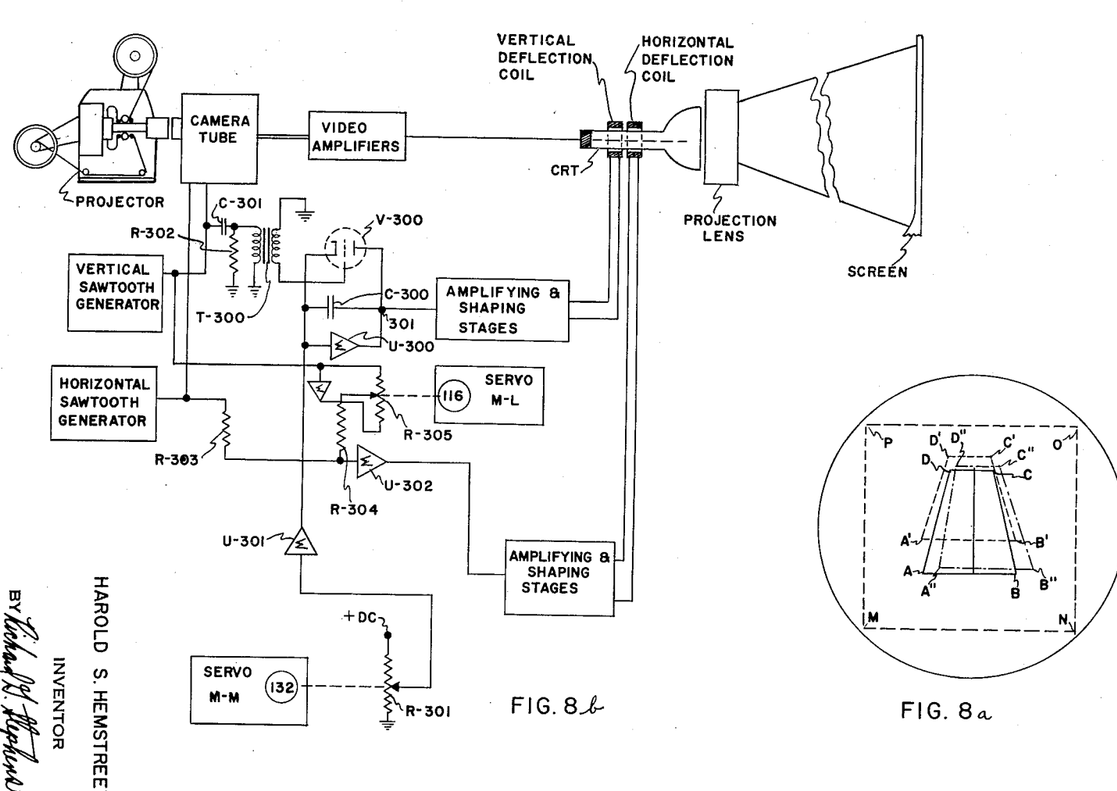
FIGS. 8a and 8b are respectively, a diagram representing the face of a cathode ray tube utilized in an alternative embodiment of the invention, and a schematic diagram of an alternative embodiment of the invention in which distortion is accomplished electrically. In all of the figures, well-known parts are shown in block diagram form for sake of clarity.

Shown in FIGURES 8a and 8b are a diagrammatic view of the face of a cathode ray tube and a schematic diagram illustrating an alternative embodiment of the invention in which distortion of the film image is accomplished electrically rather than optically. Referring to FIG. 8b the conventional motion picture projector projects an image of a reference or "ideal" flight path to a conventional television camera tube having a conventional scanning system operated by vertical and horizontal sawtooth oscillators or generators, producing a video signal which is amplified in conventional video amplifiers and applied between the grid and cathode of a conventional projection cathode ray tube CRT. The cathode ray tube is equipped in conventional manner with accelerating anodes and a high voltage power supply (not shown), and hence an image is provided on the face of the cathode ray tube CRT. This image is focused on the screen for observation by the student by a conventional projection lens system. The apparatus in FIG 8b (with the exception of the screen) may be mounted for yawing, pitching and banking in the same manner as the optical projection system disclosed above. By varying the vertical sweep rate applied to CRT in accordance with deviations of the simulated flight path from the reference path, the correct distortion for altitude deviations may be made. By varying the horizontal sweep range in accordance with lateral deviations from the reference path, the image appearing on the face of CRT may be properly distorted or "sheared" for realistic simulation.

Sweep voltage for the vertical deflection system of the cathode ray tube CRT is derived by integrating a constant voltage during a sweep cycle by means of a conventional direct current integrator, which comprises a conventional feedback amplifier U–300 provided with a capacitor C–300 in its feedback circuit. A direct voltage applied via potentiometer R–301 and summing amplifier U–301 is integrated with respect to time, providing a linearly increasing voltage at the output terminal 301 of the integrator. A circuit comprising capacitor C–301, transformer T–300 and triode V–300 is provided to discharge capacitor C–300 periodically, after which the integrating circuit will begin to integrate again, providing a sawtooth output potential at terminal 301. The integrating capacitor C–300 is discharged at the camera tube vertical sweep repetition rate by causing triode V–300 to conduct at the end of each camera tube sweep cycle. The rapid change in camera tube vertical sweep voltage during vertical retrace time is differentiated by capacitor C–301 and resistor R–302 and applied to pulse the primary of transformer T–300. The positive-going terminal of the secondary winding of transformer T–300 is connected to drive the grid of triode V–300 highly positive during retrace, causing triode V–300 to conduct so as to discharge integrating capacitor C–300, producing a vertical retrace on the projection cathode ray tube. The vertical sweep potential at terminal 301 is amplified and shaped in conventional vertical sweep amplifying means indicated in block diagram form and thereafter applied to the vertical deflection system of projection cathode ray tube CRT. While the projection cathode ray tube is shown as utilizing magnetic deflection, those skilled in the art will readily recognize that electrostatic deflection may be substituted without departing from the invention.

The rate at which the vertical sweep voltage at terminal 301 will increase is directly proportional to the amplitude of the potential applied to the integrator from potentiometer R–301. Assume that with the arm of potentiometer R–301 set in the position shown that the vertical sweep applied to CRT is such as to provide a trapezoid pattern ABCD shown in solid lines in FIG. 8a on the face of CRT. As the arm of potentiometer R–301 is driven downwardly a lesser input potential will be applied to the integrator, causing the slope of the vertical sweep voltage to decrease. It will be evident to those skilled in the art that such an increase in vertical sweep rate will cause the pattern on the face of CRT to be moved upwardly and compressed with respect to the upper edge of the raster MNOP to provide a trapezoid such as A'B'C'D'. The amount of displacement of each portion of the image will be proportional to its distance from the top of the raster, and hence it will be seen that if the upper edge of the raster is made to represent the horizon edge of each film frame projected, that the image on the face of the cathode ray tube will be uniformly squeezed or stretched with respect to the horizon by variation of the voltage applied from potentiometer R–301. Thus the vertical deflection system provided serves to produce distortion similar to that produced by the variable anamorphic attachment described above. The arm of potentiometer R–301 may be positioned in the same manner as the anamorphic apparatus by servomotor 132, which is positioned as described above in connection with FIG. 6 to a position commensurate with the ratio between simulated aircraft altitude and ideal or reference path altitude.

The horizontal sweep potential utilized to scan the camera tube is also applied via resistor R–303 and summing amplifier U–302 and conventional horizontal sweep amplifying, shaping and impedance matching means to drive the horizontal sweep system of cathode ray tube CRT. Assuming that the simulated aircraft is not laterally displaced from the ideal or reference path, no potential will be applied to amplifier U–302 via resistor R–304, and the cathode ray tube horizontal sweep will be centered on the face of tube CRT. If a constant voltage were applied via resistor R–304, it would be apparent that the picture on the face of CRT might be moved uniformly to the right or left, the top and bottom of the picture moving equal amounts. However, if a voltage increasing linearly with vertical sweep is applied via resistor R–304 all positions of the picture will be laterally displaced in amounts which vary in accordance with the distance of such portions from the top of the picture. For example, trapezoid ABCD might be altered to form trapezoid A"B"C"D", the latter being shown also slightly displaced vertically for sake of clarity. If the beginning of the vertical sweep (upper edge of the raster) represents the horizon, it will be seen that the picture on the face of CRT will be properly distorted to cause realistic simulation of lateral displacement from the ideal or reference path. Such a voltage is applied via resistor R–304 from potentiometer R–305. The winding of potentiometer R–305 is excited at opposite ends by vertical sweep voltages of opposite sense. When the arm of potentiometer R–305 is centered on the winding no voltage will appear on the arm, but as the arm is driven upwardly or downwardly a positive or negative sawtooth having a repetition rate corresponding to vertical sweep and an amplitude and polarity dependent upon the position of potentiometer R–305 will be applied to cause sloping of the picture. The arm of potentiometer R–305 may be positioned by servomotor 116 in accordance with the ratio between lateral displacement of the simulated aircraft from the reference path and altitude of the reference path in the same manner servomotor 116 was utilized to position optical wedge 107 in FIG. 6. Thus it will be seen that the vertical and horizontal sweep distorting means provided serve to distort the reference path image received by the camera tube to provide an image representing a scene as viewed from the path of simulated flight.

It should be noted that in the optical system described, that lateral or shear distortion of the film image is accomplished before vertical distortion, the rotatable wedge being mounted nearer the film than the variable anamorphic adapter. Since the wedge causes no vertical change in the image projected to the anamorphic elements, the setting of the anamorphic elements may be seen to be independent of the wedge. It is entirely within the scope of my invention, however, to place the variable vertical angular magnification means nearer the film than the lateral distortion wedge, and in such a case it will be seen that the vertical distortion caused by the anamorphic means requires that the wedge be operated in accordance with a "distorted" altitude rather than the ideal altitude. Hence in constructing such an alternative embodiment of the invention, servo M–L, which determines the ratio between lateral displacement and altitude, should be provided with simulator altitude potential on its follow-up potentiometer R–216 rather than ideal altitude potential. This may be accomplished by disconnecting the excitation shown in FIG. 6 and connecting potentiometer R–216 to potentiometer R–208 as indicated by a dashed line. To avoid aberration, wedge 107 should be placed as near as possible to an image point, and in such an alternative embodiment, an intermediate image may be formed beyond the anamorphic element and near the wedge.

In the electrical image distorting means shown in FIG. 8b the film image is scanned uniformly and linearly, and distortion is introduced by varying the horizontal and vertical sweeping of the projection picture tube CRT. It is quite within the scope of my invention to sweep the picture tube CRT with uniform sweep potentials and to introduce the required distortion by non-uniform scanning of the film with the camera tube. This may be accomplished by interchanging the camera tube sweep potential connections with the projection picture tube sweep potential connections. With such changed connections the video signals applied to the picture projection tube CRT from the camera tube will be "distorted," so that a particular portion of a vertical sweep cycle represents a particular "distorted" altitude rather than the ideal or reference altitude. The difference in operation is similar to that discussed above in regard to reversing the lenses, and hence in a system utilizing non-uniform camera tube scanning and uniform picture tube scanning, follow-up potentiometer R–216 should be excited with simulator altitude potential rather than reference altitude potential.

While I have shown an optical projection system utilizing a conventional motion picture film, it will be apparent that transparent objects other than motion picture films may be utilized to provide images having the appearance of areas as viewed from reference viewpoints, and further, that images need not be provided by projection through transparencies, but may be provided by reflection from model scenes, for example, which have the appearance of areas as viewed from the reference viewpoints.

As mentioned above it may be desirable when practicing the invention to take motion pictures of a reference path with the anamorphic apparatus set in a mean position and to provide the proper distortion by deviating the anamorphic apparatus from the mean position in accordance with deviations of simulated flight from the reference flight path. Similarly, the lateral or shear distortion means may be set in a mean or arbitrary position while the pictures are taken, and then deviated from its mean position in accordance with lateral deviations of the simulated flight path. It may be noted that in such cases the film will contain pictures which are distorted representations of an area viewed from the reference path. In providing other transparencies or in providing objects suitable for reflection of images, such transparencies or objects may be provided with distortion in amounts which may be exactly compensated for by the distortion provided by the vertical and lateral distortion means while such are positioned to arbitrary "mean positions."

Those details of the projector 99 which do not differ from conventional motion picture projectors are not shown nor explained in detail. Shutters are not shown nor explained in detail. In embodiments of the invention in which a visual display is to be provided of an entire landing, so that travel down the runway to a complete stop is to be provided, one of the numerous available continuous projection systems is deemed preferable to a projection system utilizing shutters. This may be seen by recognizing that the projection or frame rate of the system is governed by the speed at which the simulated aircraft is approaching the airport (or, actually a reference point on the airport runway), the film drive position servo motor (FIG. 6) being responsive to a potential commensurate with the instantaneous distance between the simulated aircraft and the airport. It will be seen that in a system utilizing shutters, that a flight condition during which the simulated aircraft approaches the airport reference point very slowly, that the projection rate would be very slow, causing noticeable flicker. Provision of a continuous projection system is also desirable in those embodiments in which it is deemed desirable to provide a visual display while the simulated aircraft is flown within the altitude, runway bearing and distance limits even if the simulated aircraft flight path is far removed from the runway heading. For example, the apparatus shown in FIG. 6 would cause projection of a picture if the simulated aircraft were in a particular simulated area selected by the instructor's controls even if the aircraft were heading in a direction so as to cross the runway rather than to land on it. In such a case the speed of the aircraft toward the airport reference point may be very small (or even negative), and a continuous projection system is desirable to obviate flicker.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

In keeping with the specification, the words "distortion" and "distorting" are intended to refer to controlled modification of an image, with greater magnification being applied to certain portions of the image than to other portions, or with different magnification being applied along one axis of an image than another axis, so that an alteration in apparent perspective is obtained. The words "magnify" and "magnification," of course, are intended to refer to fractional power magnification as well as to magnification greater than unity power.

Having described my invention, what I claim as new and desire to secure by Letters Patent is:

1. A method of simulating the appearance of an area as viewed from a selected viewpoint, comprising the steps of projecting an image of an object having the appearance of said area from a reference viewpoint onto a viewing surface, distorting said image of said object in a vertical sense in accordance with the vertical distance between said selected viewpoint and said reference viewpoint, and displacing portions of said images horizontally in accordance with lateral distance between said selected viewpoint and said reference viewpoint by amounts proportional to their distances below the horizon, to produce the effect of shifting the observer's station point.

2. A method of producing a visual display of scenes as viewed along a plurality of selected paths of travel, said paths of travel capable of varying in altitude and lateral position comprising the steps of providing objects having the appearance of scenes as viewed along a reference path, projecting images of said objects onto a viewing surface, varying the size of said projected images vertically in accordance with altitude deviations of said selected paths from said reference path, and displacing all below-horizon portions of said projected images horizontally in accordance with deviations in lateral position of said plurality of paths from said reference path and by amounts proportional to the distances of said portions of said images below the horizon.

3. Apparatus for producing a visual display of simulated scenes viewed along the simulated flight path flown by the operator of a grounded aircraft trainer comprising a film bearing images of scenes photographed along a reference flight path, means for projecting the images from said film, and means for controllably and variably distorting said projected images, said last-named means comprising first means for uniformly magnifying said projected images vertically in accordance with the ratio of the altitude of simulated flight to the altitude of said reference flight path and second means for displacing all points of said projected images horizontally by amounts proportional to their distances below the horizon, and means to control said second means in accordance with the distance between said simulated flight path and said reference flight path divided by the altitude of said reference flight path.

4. Apparatus according to claim 3 in which said first means comprises a lens system having a fixed angular magnification in a first plane and a variable angular magnification in a second plane perpendicular to said first plane.

5. Apparatus according to claim 3 in which said first means comprises means for converting said projected image to a video signal, means for applying said video signal to a cathode ray tube having a vertical deflection means, and means for varying the time rate of the sweep potential applied to said vertical deflection system.

6. Apparatus according to claim 3 in which said second means comprises an optical wedge disposed within the optical path of said projected images.

7. Apparatus according to claim 3 in which said second means comprises means for converting said projected image to a video signal, means for applying said video signal to a cathode ray tube having vertical and horizontal deflection systems, and means for varying the average value of the horizontal sweep potentials applied to said horizontal deflection system linearly with vertical sweep potential amplitude in an amount commensurate with lateral displacement of said simulated aircraft from said reference path.

8. Grounded training apparatus comprising, a film comprised of frames having the appearance of an area as viewed from points along a reference path, means for projecting images of said area from said film onto a viewing surface, means for deriving a first control quantity commensurate with flight of a simulated aircraft, said film having coded indicia representing the position of said points along said reference path, means for deriving a reference control quantity from said coded indicia, means for comparing said reference control quantity with said first control quantity, and means responsive to the difference between said quantities for altering said images on said viewing surface, thereby to produce the effect of shifting the observer's station point.

9. Apparatus for use in conjunction with a grounded aircraft trainer for providing a realistic visual display of a ground area, said trainer being provided with dummy controls and instruments and operable by a student to provide instrument indications simulating those of an actual aircraft during like operation of said controls, said apparatus being adapted for use with a motion picture film having a plurality of frames, each of said frames bearing a representation of said ground area as it would appear when viewed obliquely from an airborne aircraft, and each of said frames representing said area as viewed at a different point along a reference path extending obliquely toward said ground area, comprising, in combination, motion picture projection apparatus for projecting images from said film to be observed by said student, said projection apparatus being controlled in accordance with the simulated instantaneous position of said simulated aircraft from said ground area so as to project an image at any given instant from a selected frame of said film which represents said area as viewed from a distance commensurate with the simulated distance between said simulated instantaneous position of said simulated aircraft and said ground area, means for deriving a first control quantity commensurate with the ratio between the instantaneous simulated horizontal distance between said simulated aircraft and said reference path and the simulated altitude of said reference path at said simulated distance, means for deriving a second control quantity commensurate with the difference between the instantaneous simulated altitude of said simulated aircraft and the simulated altitude of said reference path at said simulated distance, variable vertical magnification means for magnifying said projected image vertically with respect to a horizon portion of said image, and lateral distortion means for modifying said image so as to laterally displace ground area portions of said image by amounts proportional to their distances below said horizon portion of said image, said first control quantity being connected to control the amount of the lateral displacement caused by said lateral distortion means and said second control quantity being connected to control the amount of magnification caused by said variable vertical magnification means.

10. Apparatus for producing a perspectively-correct visual display simulating the appearance of a ground surface area as viewed from a selected viewpoint located within a given plane by means of an object having the appearance of said area as viewed from a reference viewpoint located within said plane, said plane being perpendicular to the line-of-sight between said reference viewpoint and said surface area, comprising in combination, projection means for projecting an image of said object toward a viewing surface, said image having a horizon portion and below-horizon portions, variable anamorphic magnification means and variable image-modifying means disposed between said projection means and said viewing surface, means for deriving a first pair of computer quantities commensurate with the altitude of said selected viewpoint and the altitude of said reference viewpoint, a first servomechanism responsive to said first pair of computer quantities and operative to control said variable anamorphic magnification means to expand said projected image with respect to its horizon portion in accordance with the magnitude of the ratio between said first computer quantities, means for deriving a second pair of computer quantities commensurate with the horizontal distance from said selected viewpoint to said reference viewpoint and commensurate with said altitude of said reference viewpoint, and a second servomechanism responsive to said second pair of computer quantities and operative to control said variable image-modifying means to displace said below-horizon portions of said projected image laterally in proportion to their distances below said horizon portion and in amounts commensurate with the ratio between said second pair of computer quantities, thereby to alter the apparent perspective of said projected image.

11. Apparatus for producing a visual display simulating the appearance of a surface area as viewed at an angle from a selectable viewpoint by means of an object having the appearance of said surface area as viewed at a reference angle from a reference viewpoint, comprising, in combination, projector means for projecting an image of said object, a viewing surface disposed to receive an image projected by said projector means, and image-alteration means for distorting said image on said viewing surface to provide a display on said viewing surface simulating the appearance of said surface area as viewed from said selectable viewpoint, said image-alteration means including means for laterally displacing each portion of said projected image laterally in accordance with the ratio between the lateral distance between said viewpoints to the altitude of said reference viewpoint and by an amount proportional to the distance of each said portion of said projected image below the horizon portion of said image.

12. Apparatus according to claim 11 in which said means for laterally displacing each portion of said projected image comprises a rotatable optical wedge having a vertical taper in one dimension, means for deriving a computer control quantity commensurate with said ratio, and means responsive to said control quantity for rotatably positioning said wedge.

13. Apparatus according to claim 11 in which said means for laterally displacing each portion of said projected image comprises a television cathode ray tube deflection system having horizontal and vertical sweep circuits, means for deriving a computer control quantity commensurate with said ratio, and means responsive to said control quantity for adjusting said horizontal sweep circuit.

14. Apparatus for producing a visual display simulating the appearance of a surface area as viewed at an angle from a selectable viewpoint by means of an object having the appearance of said surface area as viewed at a reference angle from a reference viewpoint, comprising, in combination, projector means for projecting an image of said object, a viewing surface disposed to receive an image projected by said projector means, and image-alteration means for distorting said image on said viewing surface to provide a display on said viewing surface simulating the appearance of said surface area from said selectable viewpoint, said image-alteration means including means for displacing each portion of said projected image laterally in accordance with the ratio between the lateral distance between said viewpoints to the altitude of said selectable viewpoint by an amount proportional to the distance of each said portion below the horizon.

15. Apparatus according to claim 14 in which said means for displacing each portion of said image comprises a television camera horizontal sweep circuit, means for deriving a computer control quantity commensurate with said ratio, and means responsive to said control quantity for adjusting said camera horizontal sweep circuit.

16. Apparatus according to claim 14 including further image-alteration means for anamorphosing a portion of said projected image vertically in accordance with the ratio of the instantaneous altitude of said selectable viewpoint to the altitude of said reference viewpoint.

17. Apparatus according to claim 16 in which said means for anamorphosing said image is physically located so as to act upon said projected image before said means for displacing a portion thereof, so that an anamorphically-altered image is applied to said displacing means.

18. Apparatus according to claim 17 in which said means for anamorphosing comprises a variable anamorphic optical lens, and in which said means for displacing a portion of said projected image comprises a rotatable optical wedge arranged to receive light emergent from said lens.

19. Apparatus for producing a visual display of scenes viewed along the simulated flight path flown by the operator of a grounded aircraft trainer by use of a film bearing images of scenes photographed along a reference flight path, comprising means for projecting the images from said film for observation by said operator, and means for displacing portions of said projected images in proportion to their distances from the horizon and the deviation of the simulated flight path from said reference flight path, control means responsive to the instantaneous simulated flight position for adjustably controlling said means for displacing portions of said projected images thereby to produce the effect of shifting the operator's vantage point, and means controllable by said operator to determine said simulated flight path.

20. Apparatus according to claim 19 in which said displacing means comprises an optical wedge disposed to receive images projected from said object, and variable vertical angular magnification lens means disposed to receive images from said wedge.

21. Apparatus according to claim 19 in which said displacing means comprises an optical wedge disposed to receive images projected from said object, said wedge being rotatable about a vertical axis to vary the angles of incidence of said images on said wedge and connected to be rotatably positioned in accordance with the ratio between lateral displacement of said simulated flight path from said reference path and the altitude of said reference path, and variable vertical angular magnification means disposed to receive the emergent images from said wedge.

22. Apparatus according to claim 19 in which said displacing means comprises an optical wedge disposed to receive images projected from said object and a plurality of vertically cylindrical lenses axially movable with respect to each other, and means responsive to the ratio of the altitude of simulated flight to the altitude of said reference path for moving said lenses with respect to each other.

23. Apparatus according to claim 19 in which said displacing means comprises variable vertical angular magnification means disposed to receive images projected from said object and an optical wedge disposed to receive images emergent from said magnification means, said wedge being rotatable about a vertical axis and connected to be rotatably positioned in accordance with the ratio between lateral displacement of said simulated flight path from said reference path and the altitude of simulated flight.

24. Apparatus according to claim 19 in which said displacing means comprises a video signal generating device having vertical and horizontal scanning circuits, a cathode ray tube connected to receive video signals generated by said device, said tube having vertical and horizontal scanning circuits, means for driving said vertical scanning circuits at sweep rise rates varying in accordance with deviation of the altitude of simulated flight from the altitude of said reference path, and means for driving said horizontal scanning circuits with sweep potentials varying in accordance with lateral displacement of said simulated path from said reference path.

25. Apparatus according to claim 19 in which said displacing means comprises a video signal generating device having vertical and horizontal scanning circuits, a cathode ray tube connected to receive video signals generated by said device, said tube having vertical and horizontal scanning circuits, means for generating vertical and horizontal sweep potentials, means for modifying said vertical sweep potential in accordance with deviations of simulated altitude from altitude of said reference path, circuit means applying said vertical sweep potential and said modified vertical sweep potential to said vertical scanning circuits, and means for driving said horizontal scanning circuits at potentials relatively varying in accordance with lateral displacement of said simulated path from said reference path.

26. Apparatus according to claim 19 in which said displacing means comprises a video signal generating device having vertical and horizontal scanning circuits, a cathode ray tube connected to receive video signals generated by said device, said tube having vertical and horizontal scanning circuits, means for generating vertical and horizontal sweep potentials, means for varying the limits of direct current level of successive horizontal sweep potentials as a function of vertical sweep in an amount commensurate with lateral displacement of said simulated path from said reference path, and means for driving said vertical scanning circuits at sweep rise rates relatively varying in accordance with the ratio of simulated altitude to altitude of said reference path.

27. Apparatus according to claim 19 in which said means for displacing portions of said image comprises a pair of optical wedges, one of said wedges being stationary and the other of said wedges being rotatable about an axis parallel to the vertical axis of said image, and variable vertical magnification means.

28. Apparatus according to claim 19 in which said means for displacing portions of said image comprises an optical wedge rotatable about an axis parallel to the vertical axis of said image, a plane slab rotatable about an axis parallel to the aforesaid axes, and variable vertical magnification means.

29. Apparatus for producing a visual display of simulated scenes viewed along the simulated flight path flown by the operator of a grounded aircraft trainer for observation by said operator by use of an object bearing images of an area as viewed along a reference flight path, comprising, in combination means for projecting images from said object, image transformation means for displacing portions of the projected images in proportion to their distances from the horizon to produce the effect of shifting the viewpoint of said operator, each of said images being projected successively, and control means for controlling said image transformation means in accordance with the instantaneous simulated position of said operator along said simulated flight path.

30. Grounded aircraft training apparatus comprising, in combination, a student's station, simulated controls operable by a student for deriving first potentials, computer means responsive to said first potentials for deriving second potentials commensurate with the position of a simulated aircraft with respect to a first reference point, control means operable to derive third potentials commensurate with the distance of a simulated landing point from said reference point, means combining said second and third potentials to provide fourth potentials commensurate with the distance between said simulated aircraft and said simulated landing point, a viewing surface visible from said station, an object having an appearance of an area surrounding said landing point, means for projecting an image of said object onto said viewing surface, means responsive to said fourth potentials for moving said object, and means responsive to said second and third potentials for displacing portions of said image on said viewing surface in proportion to their distances from the horizon to produce the effect of shifting the student's station point.

31. In grounded aircraft training apparatus having computer means operable to derive potentials commensurate with the simulated position of a simulated aircraft with respect to a set of three mutually perpendicular reference axes, the combination of, means adjustable to provide a pair of potentials commensurate with the ground position of a simulated ground area with respect to said axes, means combining the aforesaid potentials to derive altitude, distance and bearing potentials, a transparency bearing a representation of said simulated ground area as viewed at a given angle, a projector having a light source for projecting an image of said simulated ground area, image-alteration means responsive to said altitude and bearing potentials for displacing portions of said projected image in proportion to their distance from the horizon to provide a resultant image simulating the appearance of said area as viewed from said simulated position of said aircraft and switching means responsive to said distance thereby to produce the effect of shifting the observer's station point bearing potentials for controlling energization of said light source of said projector.

32. Apparatus for producing a visual display simulating the appearance of a surface area as viewed at an angle from a selectable viewpoint by means of an object having the appearance of said surface area as viewed at a reference angle from a reference viewpoint, comprising, in combination, projector means for projecting an image of said object, a viewing surface disposed to receive an image projected by said projector means, and image-alteration means for displacing portions of said image on said viewing surface in proportion to their distance from the horizon to provide a display on said viewing surface simulating the appearance of said surface area as viewed from said selectable viewpoint, said image-alteration means including means for anamorphosing a portion of said projected image vertically in accordance with the ratio of the instantaneous altitude of said selectable viewpoint to the altitude of said reference viewpoint, thereby to produce the effect of a vertical shifting of the observer's station point.

33. Apparatus according to claim 32 in which said means for anamorphosing said image comprises a variable anamorphic lens, means for deriving a computer control quantity commensurate with said ratio, and means responsive to said control quantity for adjusting said variable anamorphic lens.

34. Apparatus according to claim 32 in which said means for anamorphosing said image comprises a television cathode ray tube vertical sweep circuit, means for deriving a computer control quantity commensurate with said ratio, and means responsive to said control quantity for adjusting said vertical sweep circuit.

References Cited in the file of this patent

UNITED STATES PATENTS

| Number | Name | Date |
|---|---|---|
| 1,307,598 | Phillips | June 24, 1919 |
| 1,753,222 | Timoney | Apr. 8, 1930 |
| 1,829,634 | Chretien | Oct. 27, 1931 |
| 1,840,799 | Waddell | Jan. 12, 1932 |
| 1,898,787 | Newcomer | Feb. 21, 1933 |
| 1,938,808 | Ceccarini | Dec. 12, 1933 |
| 1,943,172 | Ford | Jan. 9, 1934 |
| 1,950,374 | Kanolt | Mar. 6, 1934 |
| 2,062,003 | Hammond | Nov. 24, 1936 |
| 2,098,390 | Iams | Nov. 9, 1937 |
| 2,146,135 | Adams et al. | Feb. 7, 1939 |
| 2,230,149 | Weddington | Jan. 28, 1941 |
| 2,269,444 | Durham et al. | Jan. 23, 1942 |
| 2,298,476 | Goldsmith | Oct. 13, 1942 |
| 2,304,057 | Schade | Dec. 1, 1942 |
| 2,337,363 | Ames | Dec. 11, 1943 |
| 2,474,096 | Dehmel | June 21, 1949 |
| 2,510,670 | Trott | June 6, 1950 |
| 2,532,549 | Higinbotham et al. | Dec. 5, 1950 |
| 2,534,557 | Ostreicher | Dec. 19, 1950 |
| 2,591,752 | Wicklund | Apr. 8, 1952 |
| 2,603,886 | Hodgson | July 22, 1952 |
| 2,661,443 | Smith | Dec. 1, 1953 |
| 2,705,769 | Cooper | Apr. 5, 1955 |
| 2,711,593 | Lewis et al. | June 28, 1955 |
| 2,711,594 | Hickey | June 28, 1955 |
| 2,716,234 | Lester et al. | Aug. 23, 1955 |
| 2,737,654 | Tasker et al. | Mar. 6, 1956 |
| 2,784,644 | Bednarz | Mar. 12, 1957 |